United States Patent [19]

Dennison

[11] Patent Number: 4,606,512
[45] Date of Patent: Aug. 19, 1986

[54] BIMODAL FISHING REEL ASSEMBLY

[76] Inventor: Robert R. Dennison, 2220 S.W. Troy, Portland, Oreg. 97219

[21] Appl. No.: 702,943

[22] Filed: Feb. 19, 1985

[51] Int. Cl.[4] .................. A01K 89/015; A01K 89/04
[52] U.S. Cl. .......................... 242/84.2 C; 242/84.1 R
[58] Field of Search .................... 242/84.1 R, 84.2 C

[56] References Cited

U.S. PATENT DOCUMENTS 1,932,360 10/1933 Adams ................................ 242/219
2,537,590 1/1951 Kaufman ......................... 242/84.1 R
2,649,259 8/1953 Ulrich ............................. 242/84.1 C Primary Examiner—Billy S. Taylor
Attorney, Agent, or Firm—Kolisch, Hartwell & Dickinson

[57] ABSTRACT

A bimodal fishing reel assembly which includes a reel housing having a detachable side plate. Replaceable spools are mountable within the reel housing with detachment of the side plate. The side plate has two mounted positions in the reel housing. One adapts the reel for spin casting, and the other for fly casting.

6 Claims, 9 Drawing Figures

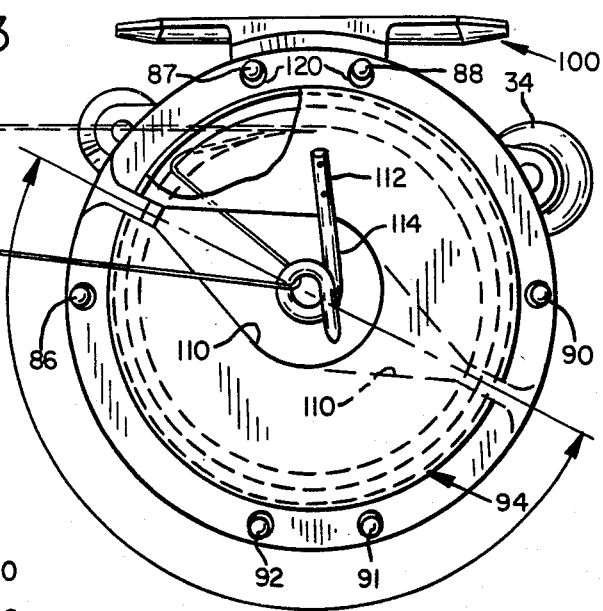
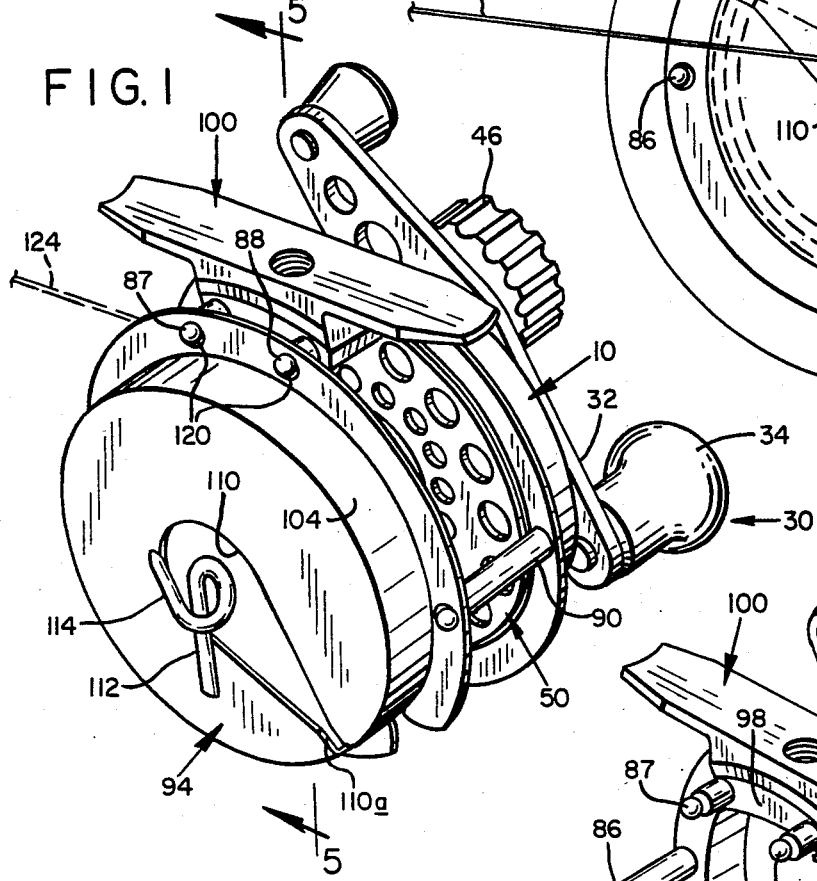
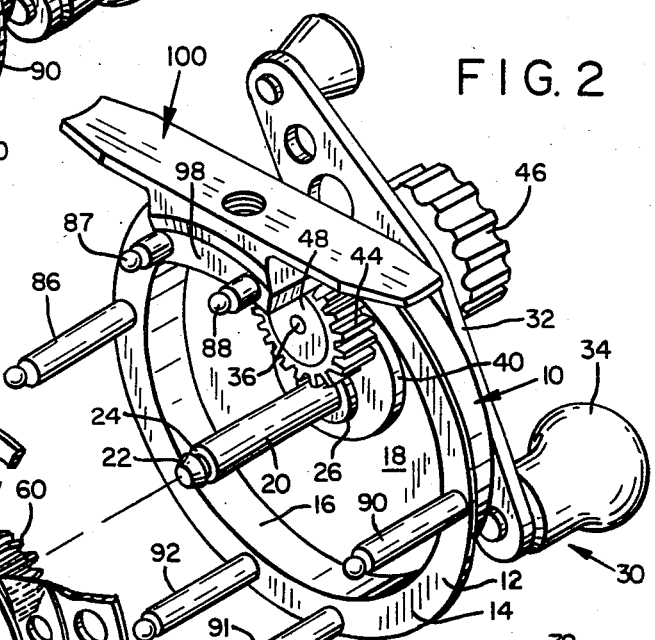
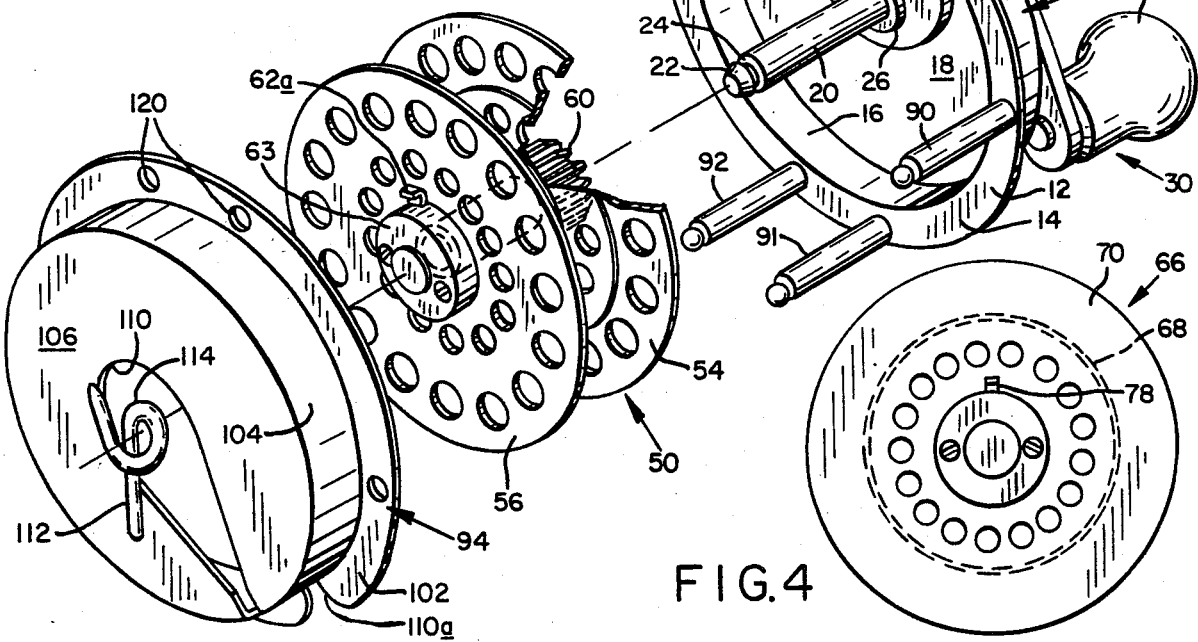

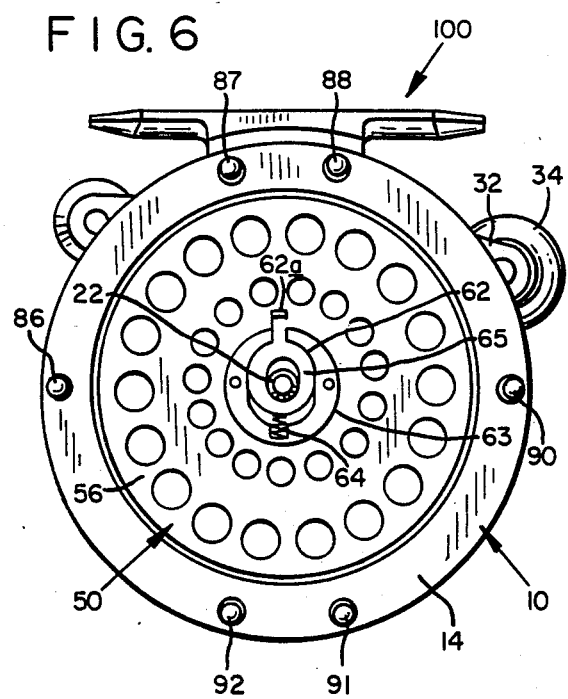
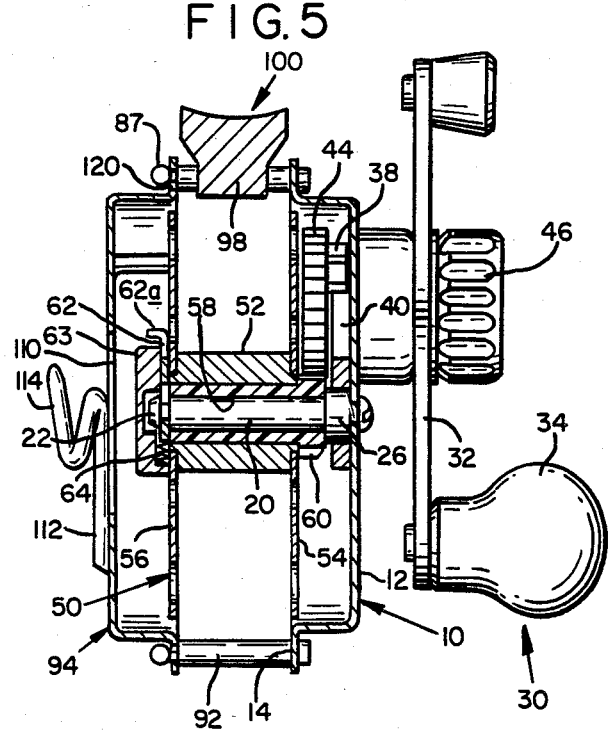
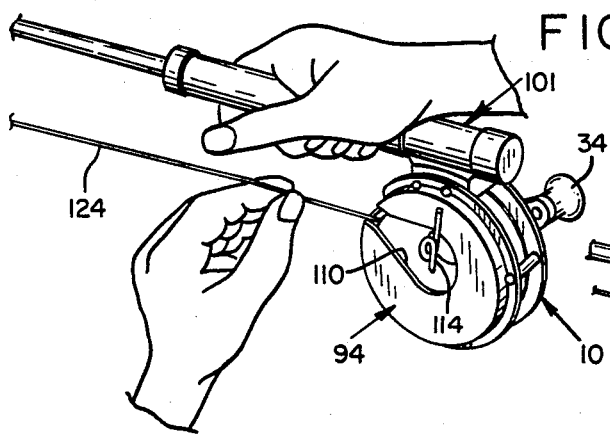
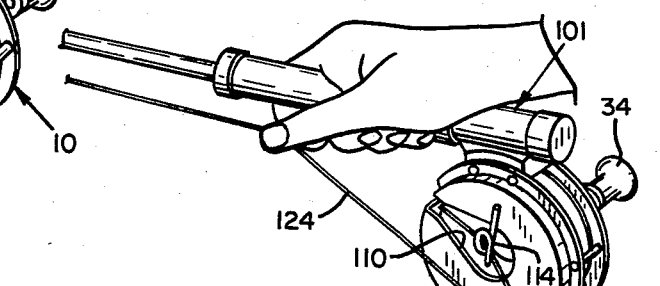
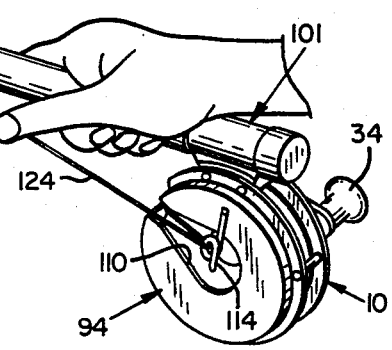

BIMODAL FISHING REEL ASSEMBLY

BACKGROUND AND SUMMARY OF THE INVENTION

This invention relates to a fishing reel, and more particularly to a bimodal fishing reel assembly which is readily converted from a fly-casting reel containing a spool with fly-casting line thereon, to a spin-casting reel containing a spool with spin-casting line such as monofilament line.

When set up for fly fishing, fly-casting line is pulled off a spool containing the line, with rotating of the spool as the line is played out, as in a conventional fly-casting reel. When set up for spin-casting, the line is stripped off a spool containing it while being pulled in a direction extending axially of the spool with the spool remaining stationary.

The reel assembly contemplated permits a fisherman greater versatility in the type of fishing he may perform. Using the reel, modern fly rods may be used for spin-casting purposes, with a new sensitivity experienced by the fisherman.

Thus, a general object of the invention is to provide a novel bimodal fishing reel assembly which can be easily set up for either fly-casting or spin-casting purposes.

Another object is to provide such a reel assembly where conversion of the reel assembly from one to another type is performed simply by removing a side plate in the reel assembly, exchanging spools, and then remounting the side plate.

Another object is to provide such a reel assembly which is easily changed from one type of reel to another, using only the hands and without the need of any special tools.

These and other objects and advantages are obtained by the invention, which is described in more detail in the following description, which is to be taken in conjunction with the accompanying drawings, wherein:

FIG. 1 is a perspective view of a reel assembly as contemplated by the invention, properly set up for fly-casting purposes;

FIG. 2 is a perspective, exploded view of the reel assembly shown in FIG. 1;

FIG. 3 is a side view of the reel assembly, showing in solid outline a detachable side plate in the position that it would have for spin-casting, and in dashed outline the position of the plate with the reel set up for fly-casting purposes;

FIG. 4 is an in view of portions of a spool of the type of that would be employed to hold windings of spin-casting line;

FIG. 5 is a cross-sectional view taken generally along the line 5—5 in FIG. 1;

FIG. 6 is a view of a side of the reel, with a detachable side plate in the reel removed; and FIGS. 7, 8, and 9 are perspective views illustrating the reel assembly as set up for spin-casting purposes and showing how the reel assembly is used in the making of a spin cast.

Referring now to the drawings, and as can be seen in FIGS. 1 and 2, the reel comprises a reel housing designated generally at 10 which includes a housing side plate shown at 12. The side plate includes an annular flange 14, a shallow cylindrical wall 16 joining with the inner margin of flange 14, and a substantially planar wall 18 joined with a margin of cylindrical wall 16.

An elongate spindle 20 projecting outwardly from housing side plate 12 is fixedly secured in a suitable manner to the center of wall 18. The free end of the spindle is tapered as at 22, and separating the tapered end from the remainder of the spindle is an annular groove 24. The spindle further includes an enlargement 26 which is adjacent wall 18. The spindle is used in the mounting of a spool in the reel. The spool when mounted on the spindle is turned by a winding assembly shown generally at 30.

Considering details of this winding assembly, a crank handle 32 mounting a knob 34 is keyed by suitable means to shaft 36, whereby rotation of the crank handle produces corresponding rotation of the shaft. On the inner side of housing side plate 12 is a ratchet wheel 38 (refer to FIG. 5) which is also keyed to shaft 36 so as to rotate with rotation of the shaft. A pawl 40 rotatably mounted on spindle enlargement 26 has an end which rides over the teeth of the ratchet wheel with shaft 36 rotated in a counterclockwise direction in FIG. 2, but which engages a ratchet tooth to prevent rotation of the ratchet wheel with the wheel rotated in a clockwise direction. A suitable spring carried by the pawl (not shown) biases the pawl so as to urge its end against the ratchet teeth.

Shown at 44 is a pinion gear which is rotatably mounted on shaft 36. Drag adjusting mechanism including an adjusting knob 46, and plate 48 secured to shaft 36, is adjustable to establish a frictional drive connection between the shaft and the pinion gear, and to vary the amount of frictional engagement between these parts.

Shown in FIGS. 1, 2, 5, and 6, and illustrated at 50, is a spool of the type that would be used to contain windings of line for fly casting, such as a double tapered fly-casting line. The spool has a central hub portion 52 which supports the windings of line, and perforated end wall 54, 56 joined to this central hub portion. An elongate cylindrical passage extends inwardly from one end of the spool into the hub portion, such being shown at 58. Extending about the entrance of this passage is a spur gear 60, this gear being suitably secured to the spool.

At the opposite end of the spool from spur gear 60 is an actuator 62 adjustably mounted within a boss 63. This actuator terminates in an outer, turned over end 62a. The actuator is spring biased outwardly to the position shown where the turned over end is spaced slightly from boss 63 by a spring 64. The actuator is depressible by finger actuation against the bias of the spring to bring ring portion 65 which is part of the inner part of the actuator into axial alignment with passage 58.

In mounting a spool in the reel, the spool is manipulated to bring spindle 20 into the center of spur gear 60. The spool may then be shifted axially along the spindle to its final seated position, where end wall 54 is substantially flush with flange 14 of the housing side plate. With final seating of the spool, ring portion 65 of the actuator 62 moves over tapered end 22 of the spindle, to become seated in annular groove 24. This locks the spool from removal. To remove the spool, the actuator is depressed, which frees the ring portion from the groove thus to enable the spool to be shifted axially outwardly on the spindle.

With the spool in place, spur gear 60 meshes with pinion gear 44. Rotation of crank handle 32 in a counterclockwise direction in FIG. 1 serves to rotate the spool through rotation of the pinion gear and spur gear in a clockwise direction in FIG. 1. The crank handle is prevented from rotation in the opposite direction by the pawl construction earlier described. Counterclockwise rotation of the spool to permit pulling off of line is accommodated by the drag mechanism earlier described.

In FIG. 4, there is illustrated a spool 66 useable in holding spin-casting line windings, as exemplified by modern monofilament line. This line being of lesser average diameter than a tapered fly line, and being essentially non-water absorbent, hub 68 of this spool can be larger than that of the spool 50, and end walls exemplified by end wall 70 of the spool may be imperforate where they bound the region which receives the line windings.

Like spool 50, the hub portion of the spool is provided with a passage extending in from one end thereof, a spur gear secured to the spool and surrounding the entrance to this passage, and an actuator (shown at 78) adjustably mounted adjacent the end wall opposite the end wall having the spur gear. With spool 50 removed from the reel and spool 66 substituted therefor, end wall 70 becomes positioned substantially flush with annular flange 14 of the housing side plate.

Referring again to FIG. 2, mounted on annular flange 14 of the housing side plate and projecting outwardly from the side plate, in directions generally paralleling the direction of the spindle, are a series of posts 86, 87, 88, 90, 91, 92. The posts are utilized in detachably mounting a detachable side plate 94 in a position opposite to and spaced from housing side plate 12.

Posts 87, 88 perform an additional function. These posts, which are adjacent the top of the reel, extend through the base 98 of a mounting shoe member 100. The base is fixedly secured to these posts. The mounting shoe member is relied upon in the mounting of the reel in a conventional manner on the underside of a fishing rod handle shown at 101 in FIG. 7.

Side plate 94 (see FIG. 2) includes an annular flange portion 102, a cylindrical wall 104 portion joining with the inner margin of flange portion 102, and a substantially flat or planar wall portion 106 joining with a margin of cylindrical wall portion 104.

An elongate opening or line-passing channel 110 extends from the center of side plate 94 and outwardly therefrom to an open entry 110a where the opening joins with the edge of the side plate. Fastened to the outside of the side plate is a pigtail 112 which has an open loop portion 114 disposed substantially centrally of the side plate.

Holes or bores 120 are provided which are distributed about flange portion 102. These holes receive the ends of posts 86-92. As can be seen with reference to FIG. 2, the ends of these posts take the form of rounded projections, and these projections are offset slightly from the axis of the posts. With the detachable side plate not mounted in place, but just laid loosely on the posts, the rounded ends of the posts are not exactly in registry with holes 120. With seating of the side plate in position, a slight flexing occurs in the interfitting parts which enables the rounded ends of the posts to pass through the holes, with a snap-acting fit resulting.

The detachable side plate is removable from the mounted position without the use of tools and merely by pulling on an edge of the side plate, with snap-acting release occurring. A slight flexibility built into the side plate by reason of the presence of opening 110 permits slight distortion of the plate during removal which facilitates the removal process.

It will be noted that the posts, and the holes in side plate 94, are not equally circumferentially distributed from each other. Thus, it will be noted that posts 87, 88 and 91, 92 are disposed as pairs in regions located on diametrically opposite sides of the reel. Posts 86, 90 on the other hand appear as single posts on diametrically opposite sides of the reel. The arrangement of the posts is such that two seated positions are defined for side plate 94 in the reel assembly. One is shown in FIG. 3 in solid outline, with opening 110 extending upwardly and forwardly in the reel. The other is shown dashed outline in FIG. 3, where the side plate has been rotated about its center 180°, to place opening 110 with such extending rearwardly and downwardly in the reel.

The reel as set up for fly-casting is shown in FIG. 1. With this mode of assembly, the spool containing the windings of fly-casting line (spool 50) is mounted on spindle 20. As the reel assembly is pictured in FIG. 8, any line on the spool would extend in counterclockwise windings from the end which is secured to the hub of the spool, and thence outwardly from the top of the reel to the left, as shown for line 124. The detachable side plate is mounted on the reel with opening 110 extending downwardly and rearwardly. That part of the side plate which extends forwardly form post 87 is bounded by a continuous, uninterrupted edge. A fisherman may pull line from the reel, with the spool rotating in a counterclockwise direction to pay out the line.

To set up the reel for spin-casting, the detachable side plate is removed, and the spool with the fly-casting line is removed. Spool 66 containing the spin-casting line is then mounted in the reel. Side plate 94 is then remounted, this time however, with the side plate rotated 180° from the position it formerly had. This positions opening 110 where such extends upwardly and forwardly in the reel, as shown in FIGS. 7, 8, and 9.

To prepare the reel for casting, the line is pulled as shown in FIG. 7, holding the line between the left thumb and forefinger. The line is then brought down through the side opening, and passed through the center of the pigtail, as illustrated in FIG. 8. As so arranged, the reel becomes a side-cast spinning reel, with line moving off its spool without rotation of the spool and over the edge of the end wall of the spool which faces the viewer in FIG. 9.

It is claimed and desired to secure by Letters Patent:
1. A bimodal fishing reel comprising
a real housing including a housing side plate and a mounting shoe disposed above said housing side plate used in attaching the reel to a fishing rod,
a spindle mounted on the housing side plate and projecting outwardly therefrom,
a spool rotatably and detachably mountable on said spindle,
a detachable side plate spaced from and disposed opposite said housing side plate, said housing and detachable side plates extending in covering relation over the ends of a spool mounted on said spindle,
a line-passing channel extending from the center of the detachable side plate to an edge thereof and having an entrance communicating with an edge portion of the side plate, and
mounting means comprising a series of posts extending outwardly from adjacent the periphery of said housing side plate mounting said detachable side plate on said reel housing with said side plate detachably and fixably held in one position where said channel is oriented to extend upwardly and forwardly in the reel, said posts being symmetrically distributed about the periphery of the housing side plate to have corresponding positions on opposite sides of a plane bisecting said housing side plate and providing for the detachable and fixed holding of the side plate in another position where said channel is oriented to extend in the opposite direction in the reel, the first position of the side plate accommodating use of the reel for spin-casting purposes and the second position of the side plate accommodating use of the reel for fly-casting purposes.

2. The bimodal reel of claim 1, wherein aid mounting means includes plate-manipulated release means actuated through manipulation of the detachable side plate to effect release of the detachable side plate from the reel housing.

3. The reel of claim 2, wherein said plate-manipulatable release means comprises rounded projections on said posts which are displaced with flexing of the posts.

4. The reel of claim 1, wherein said mounting means further comprises seating means in the detachable side plate for seating the ends of said posts, said posts and seating means having mutually registering positions with the detachable side plate in its said first and in its said second positions.

5. The reel of claim 4, wherein full seating of the ends of the posts in said seating means is accommodated with yieldably resisted flexing of the posts.

6. A bimodal fishing reel kit comprising
 a reel housing including a housing side plate and a mounting shoe disposed above said housing side plate used in attaching the reel to a fishing rod,
 a spindle mounted on the housing side plate and projecting outwardly therefrom,
 a first spool adapted to contain windings of fly-fishing line and a second spool adapted to contain windings of spin-casting line used in spin-casting, each spool being rotatably and detachably mountable on said spindle with the exclusion of the other spool,
 a detachable side plate spaced from and disposed opposite said housing side plate, said housing and detachable side plates extending in covering relation over the ends of a spool mounted on said spindle,
 a line-passing channel extending from the center of the detachable side plate to an edge thereof and having an entrance communicating with an edge portion of the side plate, and
 mounting means comprising a series of posts extending outwardly from adjacent the periphery of said housing side plate, mounting said detachable side plate on said reel housing with said side plate detachably and fixably held in one position where said channel is oriented to extend upwardly and forwardly in the reel assembly, said posts being symmetrically distributed about the periphery of the housing side plate to have corresponding positions on opposed sides of a plane bisecting said housing side plate and providing for the detachable and fixed holding of the side plate in another position where said channel is oriented to extend in a direction opposite to said one direction, the first position of the side plate and with the spool adapted to contain windings of spin-casting line mounted on said spindle producing a spin-casting reel and the second position of the side plate and with the spool adapted to contain windings of fly-fishing line producing a fly-fishing reel.

* * * * *